Jan. 29, 1924.
F. P. SHERONAS
1,482,156
ANTISKID ATTACHMENT
Filed March 15, 1921
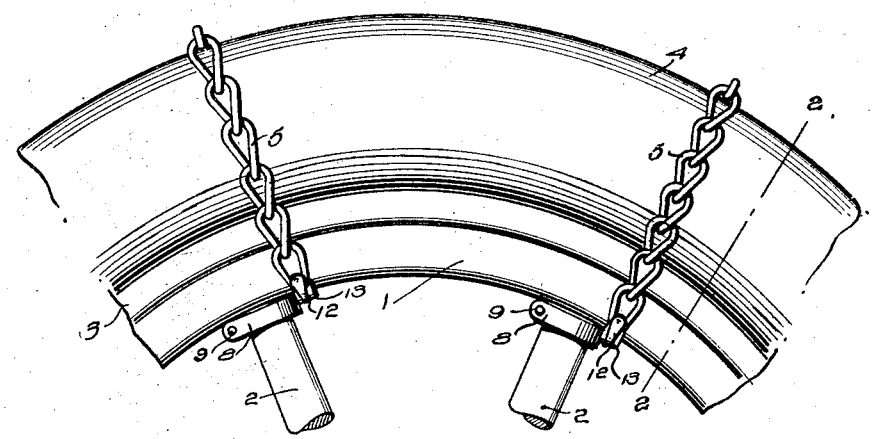
Fig. 1.
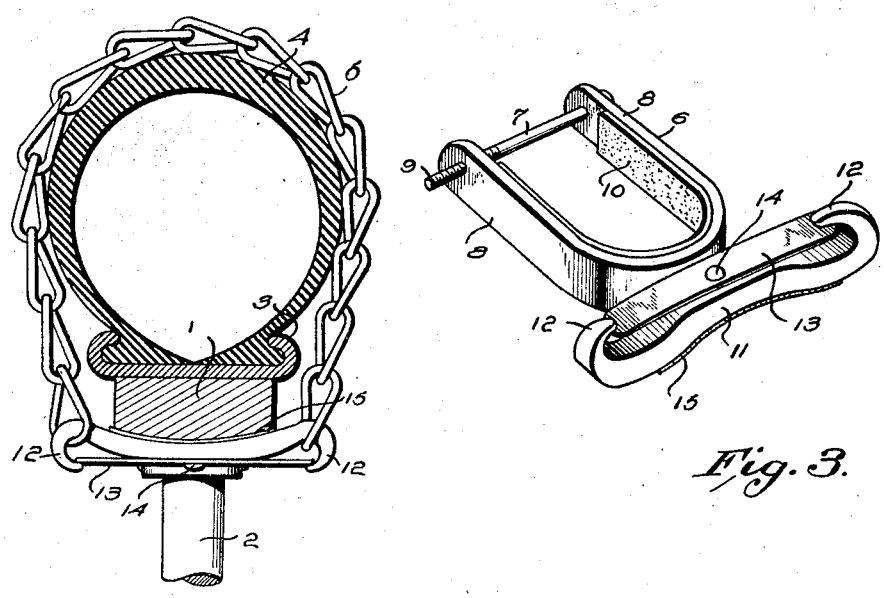
Fig. 2.
Fig. 3.
Inventor
F.P. SHERONAS
By
C. h. Parker, Attorney Patented Jan. 29, 1924.

1,482,156

UNITED STATES PATENT OFFICE.

FRANK P. SHERONAS, OF NEW HAVEN, CONNECTICUT.

ANTISKID ATTACHMENT.

Application filed March 15, 1921. Serial No. 452,491.

*To all whom it may concern:*

Be it known that I, FRANK P. SHERONAS, a citizen of the United States, residing at New Haven, in the county of New Haven and State of Connecticut, have invented certain new and useful Improvements in Antiskid Attachments, of which the following is a specification.

This invention relates to anti-skid attachments for tires, and it comprises a chain extending transversely of the tire, and fastening means for said chain, said means comprising a pair of snap hooks arranged beneath the felly of the tire and adapted to receive the ends of the chain, a substantially U-shaped member to which said snap hooks are secured, said U-shaped member being adapted to embrace one of the spokes of the wheel, and means for retaining said member in position.

In the present invention, I have provided a very simple form of anti-skid attachment consisting of a plurality of separate chains, and means for securing each chain to the wheel. The attachments may be separately applied to the portion of the wheel off the ground and the wheel revolved until the desired number of attachments have been secured in position. This eliminates the necessity of raising the wheels from the ground to apply a chain extending entirely around the tires.

In the present invention, the ends of the chain are secured in ordinary snap hooks, and may be readily attached or released. The device comprises a single fastening element in the nature of a pin or bolt, adapted to be arranged in the open side of the U-shaped member surrounding the spoke.

In the accompanying drawings, I have shown one embodiment of the invention. In this showing:

Figure 1 is a side elevation of a portion of a tire showing the invention applied, Figure 2 is a vertical transverse sectional view on line 2—2 of Figure 1, and, Figure 3 is a perspective view of the securing member removed.

Referring to the drawings, the reference numeral 1 designates the felly of a wheel which is provided with spokes 2, and a rim 3 for the reception of a tire 4.

The invention comprises a chain 5, which is adapted to be arranged transversely of the tire, the ends of the chain extending inwardly beyond the felly.

The securing member comprises a U-shaped member 6 which is adapted to embrace the spoke of the wheel, and is provided with a threaded bolt or pin 7, connecting the ends of the arms 8. A nut or other suitable fastening element (not shown) may be arranged on the threaded end 9 of the pin. As shown, a strip of felt or other suitable material may be arranged between the U-shaped member and the spoke of the wheel to prevent scratching or marring of the surface of the spoke when the attachment is applied.

A plate 11 is secured to the bottom of the U-shaped member, and this plate is provided with curved ends 12. A piece of spring metal 13 is secured to the plate 11, intermediate its ends, as at 14, the ends of the spring being arranged beneath the curved ends 12 of the plate 11, to form a pair of snap hooks. As shown, the ends of the chain are adapted to be received in the snap hooks. A piece of felt or other similar material may be arranged beneath the plate 11, as at 15, to prevent scarring the felly of the wheel. As shown, the under surface of the plate 11 may be shaped to substantially conform to the shape of the felly (see Figure 2).

It will be apparent that I have provided an attachment which may be readily applied to the wheels of a motor vehicle without the necessity of raising the wheel from the ground. When the attachments are to be placed in position, a number of them may be arranged on the wheel and secured to the spokes, and the wheel then revolved a portion of a revolution to bring another portion of the wheel into proper position to permit application of the attachments. In applying the device, it is merely necessary to remove the pin 7 and place the U-shaped member around the spoke. The pin 7 may then be replaced and the securing member is retained in position. The chain 5 is then arranged over the tire and the ends received in the snap hooks 12.

It is to be understood that the form of my invention herewith shown and described is to be taken as a preferred example of the same, and that various changes in the shape, size, and arrangement of parts may be resorted to without departing from the spirit of my invention or the scope of the subjoined claims.

Having thus described my invention, I claim:

1. An anti-skid attachment for wheels, comprising a U-shaped member adapted to embrace a spoke of the wheel, a threaded pin connecting the arms of said U-shaped member to retain it in position on the spoke, a plate secured to the base of said U-shaped member and extending transversely of the wheel, one side of said plate being curved to fit the inner side of the felly of the wheel, said plate being provided with curved ends, a piece of spring metal secured to said plate and cooperating with said curved ends to form chain securing means, and a chain extending transversely of the wheel and having its ends secured in said chain securing means.

2. An anti-skid attachment for wheels comprising a U-shaped member adapted to embrace a spoke of the wheel, a threaded pin connecting the arms of said U-shaped member to retain it in position on the spoke, a plate secured to said U-shaped member and extending transversely of the wheel, said plate being provided with curved ends, a piece of spring metal secured to said plate and cooperating with said curved ends to form chain securing means, and a chain arranged transversely of the wheel and having its ends secured in said chain securing means.

In testimony whereof I affix my signature in presence of two witnesses.

FRANK P. SHERONAS.

Witnesses:
ROBERT J. WOODRUFF,
HELEN W. BUTLER.